US010616327B2

(12) United States Patent
Nichols et al.

(10) Patent No.: US 10,616,327 B2
(45) Date of Patent: Apr. 7, 2020

(54) POLICY BASED HYDRATION BEHAVIOR IN CLOUD STORAGE SYNCHRONIZATION

(71) Applicant: MICROSOFT TECHNOLOGY LICENSING, LLC, Redmond, WA (US)

(72) Inventors: Jack Allen Nichols, Bothell, WA (US); Ed Averett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 464 days.

(21) Appl. No.: 15/271,185

(22) Filed: Sep. 20, 2016

(65) Prior Publication Data

US 2018/0084044 A1 Mar. 22, 2018

(51) Int. Cl.
G06F 16/16 (2019.01)
H04L 29/08 (2006.01)
G06F 16/178 (2019.01)
G06F 16/182 (2019.01)

(52) U.S. Cl.
CPC .......... *H04L 67/1095* (2013.01); *G06F 16/16* (2019.01); *G06F 16/178* (2019.01); *G06F 16/1844* (2019.01); *H04L 67/1097* (2013.01)

(58) Field of Classification Search
CPC ......... G06F 17/30174; G06F 17/30115; G06F 16/16; G06F 16/178; G06F 16/1844; H04L 67/1095
USPC ........................................................ 707/620
See application file for complete search history.

(56) References Cited

U.S. PATENT DOCUMENTS

| 5,634,122 A | 5/1997 | Loucks et al. |
| 6,356,915 B1 | 3/2002 | Chtchetkine et al. |
| 7,779,034 B2 | 8/2010 | Pedersen et al. |
| 8,099,758 B2 | 1/2012 | Schaefer et al. |
| 8,276,137 B2 | 9/2012 | Doyle et al. |

(Continued)

FOREIGN PATENT DOCUMENTS

| GB | 2504402 A | 1/2014 |
| WO | 2014178906 A1 | 11/2014 |

OTHER PUBLICATIONS

Thurrott, Paul, "OneDrive Tip: Use Documents and Other Libraries with OneDrive", Published on: Feb. 28, 2015 Available at: https://www.thurrott.com/cloud/microsoft-consumer-services/onedrive/1646/onedrive-tip-use-documents-and-other-libraries-with-onedrive.

(Continued)

*Primary Examiner* — Jean M Corrielus
(74) *Attorney, Agent, or Firm* — Michael Best & Friedrich LLP (57) ABSTRACT

Policy based hydration behavior in cloud storage synchronization is provided. In some examples, user intent and defined policy or policies may be examined by a synchronization engine to determine when a synchronization should be aborted and instead redirected to viewing the requested file from the cloud, thereby avoiding the download. The synchronization engine may include a web interface with the ability to display and edit different types of files in this fashion. In addition to redirecting to the cloud, hydration may be blocked entirely in other examples. In a further example, a selective synchronization dialog may be launched to allow the user specify select action(s). A policy that dictates the hydration behavior may be persisted and updated as needed. To implement the policy, required operations on the local machine may be intercepted.

20 Claims, 8 Drawing Sheets

(56) References Cited

U.S. PATENT DOCUMENTS

| | | | |
|---|---|---|---|
| 8,412,754 | B2 | 4/2013 | Chen et al. |
| 8,706,971 | B1 | 4/2014 | Nayak |
| 8,751,604 | B2 | 6/2014 | Liebman |
| 8,799,414 | B2 | 8/2014 | Taylor et al. |
| 8,880,580 | B2 | 11/2014 | Simmons et al. |
| 9,020,992 | B1 | 4/2015 | Gunda et al. |
| 9,069,829 | B2 | 6/2015 | Kwiatkowski et al. |
| 9,087,076 | B2 | 7/2015 | Nickolov et al. |
| 9,104,340 | B2 | 8/2015 | Prahlad et al. |
| 9,166,866 | B2 * | 10/2015 | Novak ............. G06F 17/30153 |
| 9,218,350 | B2 | 12/2015 | Novak et al. |
| 9,235,587 | B2 | 1/2016 | Hahn |
| 9,239,762 | B1 | 1/2016 | Gunda et al. |
| 9,239,860 | B1 | 1/2016 | Love et al. |
| 9,253,047 | B2 | 2/2016 | Mishra et al. |
| 9,396,209 | B2 * | 7/2016 | Fukui ................... G06F 16/192 |
| 9,405,767 | B2 * | 8/2016 | Novak ............. G06F 17/30115 |
| 9,524,151 | B2 * | 12/2016 | Chan .......................... G06F 9/54 |
| 9,753,816 | B2 * | 9/2017 | Mehta .................. G06F 16/162 |
| 2004/0019613 | A1 | 1/2004 | Jones et al. |
| 2004/0162876 | A1 | 8/2004 | Kohavi |
| 2005/0223047 | A1 | 10/2005 | Shah et al. |
| 2006/0069662 | A1 | 3/2006 | Laborczfalvi et al. |
| 2006/0200570 | A1 | 9/2006 | Stirbu et al. |
| 2007/0214128 | A1 | 9/2007 | Smith et al. |
| 2009/0172274 | A1 | 7/2009 | Nochimowski et al. |
| 2009/0193107 | A1 | 7/2009 | Srinivasan et al. |
| 2009/0313702 | A1 | 12/2009 | Mandava |
| 2010/0030739 | A1 | 2/2010 | Lanjewar et al. |
| 2010/0293141 | A1 | 11/2010 | Anand et al. |
| 2011/0153697 | A1 | 6/2011 | Nickolov et al. |
| 2012/0017261 | A1 | 1/2012 | Lim |
| 2012/0179553 | A1 | 7/2012 | Duggal |
| 2013/0014047 | A1 | 1/2013 | Joo et al. |
| 2013/0185258 | A1 | 7/2013 | Bestler et al. |
| 2013/0226876 | A1 * | 8/2013 | Gati ...................... G06F 16/178 |
| | | | 707/652 |
| 2013/0275375 | A1 | 10/2013 | Nickolov et al. |
| 2014/0006465 | A1 | 1/2014 | Davis et al. |
| 2014/0032691 | A1 * | 1/2014 | Barton ................... H04L 41/00 |
| | | | 709/206 |
| 2014/0032758 | A1 * | 1/2014 | Barton ................... H04L 41/00 |
| | | | 709/225 |
| 2014/0259005 | A1 | 9/2014 | Jeffrey et al. |
| 2014/0289191 | A1 * | 9/2014 | Chan .......................... G06F 9/54 |
| | | | 707/610 |
| 2014/0324776 | A1 | 10/2014 | Novak et al. |
| 2014/0324777 | A1 | 10/2014 | Novak et al. |
| 2014/0324945 | A1 * | 10/2014 | Novak ................ H04L 29/0854 |
| | | | 709/203 |
| 2014/0330874 | A1 | 11/2014 | Novak et al. |
| 2014/0337577 | A1 | 11/2014 | Burton et al. |
| 2014/0358860 | A1 | 12/2014 | Wautier et al. |
| 2014/0372376 | A1 | 12/2014 | Smith et al. |
| 2015/0012495 | A1 | 1/2015 | Prahlad et al. |
| 2015/0052105 | A1 | 2/2015 | Nguyen |
| 2015/0067005 | A1 | 3/2015 | Avati |
| 2015/0254119 | A1 | 9/2015 | Gallardo et al. |
| 2015/0347447 | A1 | 12/2015 | Ho et al. |
| 2016/0063027 | A1 * | 3/2016 | Brand .................. G06F 16/178 |
| | | | 707/620 |
| 2016/0192178 | A1 | 6/2016 | Blong et al. |
| 2016/0291856 | A1 | 10/2016 | von muhlen et al. |
| 2016/0330256 | A1 * | 11/2016 | Novak ............. G06F 17/30115 |
| 2016/0359949 | A1 | 12/2016 | Hess et al. |
| 2017/0251257 | A1 | 8/2017 | Obrien |
| 2018/0039652 | A1 * | 2/2018 | Nichols .............. G06F 17/3007 |
| 2018/0041418 | A1 | 2/2018 | Abe et al. |
| 2018/0046635 | A1 * | 2/2018 | Nichols ............. G06F 17/30082 |
| 2018/0060345 | A1 * | 3/2018 | Christiansen ......... G06F 3/0611 |
| 2018/0084045 | A1 | 3/2018 | Nichols et al. |
| 2018/0329923 | A1 * | 11/2018 | Brand .................. G06F 16/178 |
| 2019/0272253 | A1 * | 9/2019 | Vibhor ................... H04L 67/18 |

OTHER PUBLICATIONS

Huculak, Mauro, "How to overcome the placeholder limitation of OneDrive in Windows 10", Published on: Sep. 4, 2015 Available at: http://www.windowscentral.com/fix-placeholder-limitation-onedrive-windows-10.

"Set the default open behavior for browser-enabled documents (Office Web Apps when used with SharePoint 2013)", Published on: Feb. 5, 2014 Available at: https://technet.microsoft.com/en-us/library/ee837425.aspx.

Rubino, Daniel, "Microsoft responds to Windows 10 OneDrive 'selective sync' controversy", Published on: Nov. 14, 2014 Available at: http://www.windowscentral.com/microsoft-responds-windows-10-onedrive-selective-sync.

Cohen, Peter, "How to save disk space on your Mac by selectively syncing Dropbox folders", Published on: Apr. 23, 2014 Available at: http://www.imore.com/how-save-disk-space-your-mac-selectively-syncing-dropbox-folders.

"How do I save space on my computer with selective sync?", Retrieved on: Jul. 13, 2016 Available at: https://www.dropbox.com/en/help/175#harddrive.

Paul, Ian, "How to use Google Drive's selective sync", Published on: Apr. 19, 2016 Available at: http://www.pcworld.com/article/3057217/google-apps/how-to-use-google-drives-selective-sync.html.

"International Search Report and Written Opinion Issued in PCT Application No. PCT/US2017/051243", dated Nov. 9, 2017, 13 Pages.

"Goodsync Key feature", Retrieved From: https://web.archive.org/web/20150204051422/http://www.goodsync.com/features, Feb. 4, 2015, 5 Pages.

"Orchestration Dehydration and Rehydration", Retrieved From: https://docs.microsoft.com/en-us/biztalk/core/orchestration-dehydration-and-rehydration?redirectedfrom=MSDN, Feb. 27, 2009, 2 Pages.

"Sync infinite cloud storage", Retrived from: https://web.archive.org/web/20161110113357/https://www.odrive.com/features/sync, Retrieved on: Jul. 13, 2016, 10 Pages.

"Non Final Action Issued in U.S. Appl. No. 15/225,851", dated Dec. 3, 2018, 37 Pages.

"Final Office Action Issued in U.S. Appl. No. 15/271,199", dated Sep. 18, 2018, 16 Pages.

"Non Final Office action Issued in U.S. Appl. No. 15/271,199", dated Mar. 28, 2018, 17 Pages.

Azab, et al., "Stroll: A Universal Filesystem-Based Interface for Seamless Task Deployment in Grid Computing", In Proceedings of the Distributed Applications and Interoperable Systems, Jun. 13, 2012, pp. 162-176.

Johnson, Aric, "A Gift to Designers from the Cloud Storage Gods", Retrieved From: https://medium.odrive.com/a-designers-gift-from-the-cloud-storage-gods-cdca39376858, Jun. 22, 2016, 9 Pages.

"International Search Report and Written Opinion Issued in PCT Application No. PCT/US2017/043820", dated Oct. 17, 2017, 14 Pages.

"International Search Report and Written opinion Issued in PCT Application No. PCT/US2017/051242", dated Nov. 20, 2017, 11 Pages.

Shan, et al., "An Overlay File System for Cloud-Assisted Mobile Applications", In Proceedings of the 32nd Symposium Mass Storage Systems and Technologies, May 2, 2016, 14 Pages.

Zhao, et al., "HyCache: a User-Level Caching Middleware for Distributed File Systems", In Proceedings of IEEE 27th International Symposium on Parallel & Distributed Processing Workshops and PhD Forum, May 20, 2013, pp. 1997-2006.

"Final Office Action Issued in U.S. Appl. No. 15/225,851", dated Jun. 13, 2019, 33 Pages.

"Advisory Action Issued in U.S. Appl. No. 15/225,851", dated Sep. 26, 2019, 6 Pages.

"Non Final Office Action Issued in U.S. Appl. No. 15/271,199", dated Oct. 7, 2019, 16 Pages.

* cited by examiner

POLICY BASED HYDRATION BEHAVIOR IN CLOUD STORAGE SYNCHRONIZATION

BACKGROUND

Placeholders are a synchronization engine feature that provides a means in situations like when a user wants to synchronize more content than they may have disk space for, when the user wants to allocate space for other things, policy, and so on. Instead of synchronizing an entire file, a small "placeholder" file may be synchronized instead. When the user interacts with the file, the synchronization engine may download (or "hydrate") the contents to disk just in time. The effect is that the user may see their entire namespace, regardless of disk space, and can interact with their files as normal, as long as they are online. One aspect of placeholders is that there is minimal (if any) application compatibility work, as aside from slow opens and reads, applications are largely unaware that files are hydrated just-in-time.

In an example scenario, an application that is attempting to open a cloud stored file is usually blocked from continuing until the open operation completes. For small files and a fast network connection, the delay may not be noticeable; however, for larger files and/or slower connections the delay may degrade user experience or even result in a crash of the application. The results may not be desirable especially in open operations to just read the file and not to modify.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to policy based hydration behavior in cloud storage synchronization. In some examples, a request to synchronize a cloud stored file to a local storage may be received and a policy applicable to the cloud stored file may be determined. Whether a synchronization of the cloud stored file is to be redirected or blocked may be determined based on the determined policy. The synchronization may be redirected to a cloud based operation on the cloud stored file or blocked entirely based on the determination.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, embodiments are directed to policy based hydration behavior in cloud storage synchronization. In some examples, user intent and defined policy or policies may be examined by a synchronization engine to determine when a hydration (e.g., a placeholder hydration) should be aborted and instead redirected to viewing the requested file from the cloud (e.g., on the web), thereby avoiding the download. The synchronization engine may include a web interface with the ability to display and edit different types of files in this fashion. In addition to redirecting to the cloud, hydration may be blocked entirely in other examples. In a further example, a synchronization dialog may be launched to allow the user specify other action(s). A policy that dictates the hydration behavior may be persisted and updated as needed. To implement the policy, required file and disk I/O operations or similar on the local machine may be intercepted. The synchronization engine may determine and execute a suitable action. If the user indeed wishes to hydrate the file (and allowed by the policy), hydration may be performed from the cloud storage. While placeholders are used as illustrative examples, embodiments may also be implemented in non-placeholder scenarios such as selective synchronization.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing policy based hydration behavior in cloud storage synchronization. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
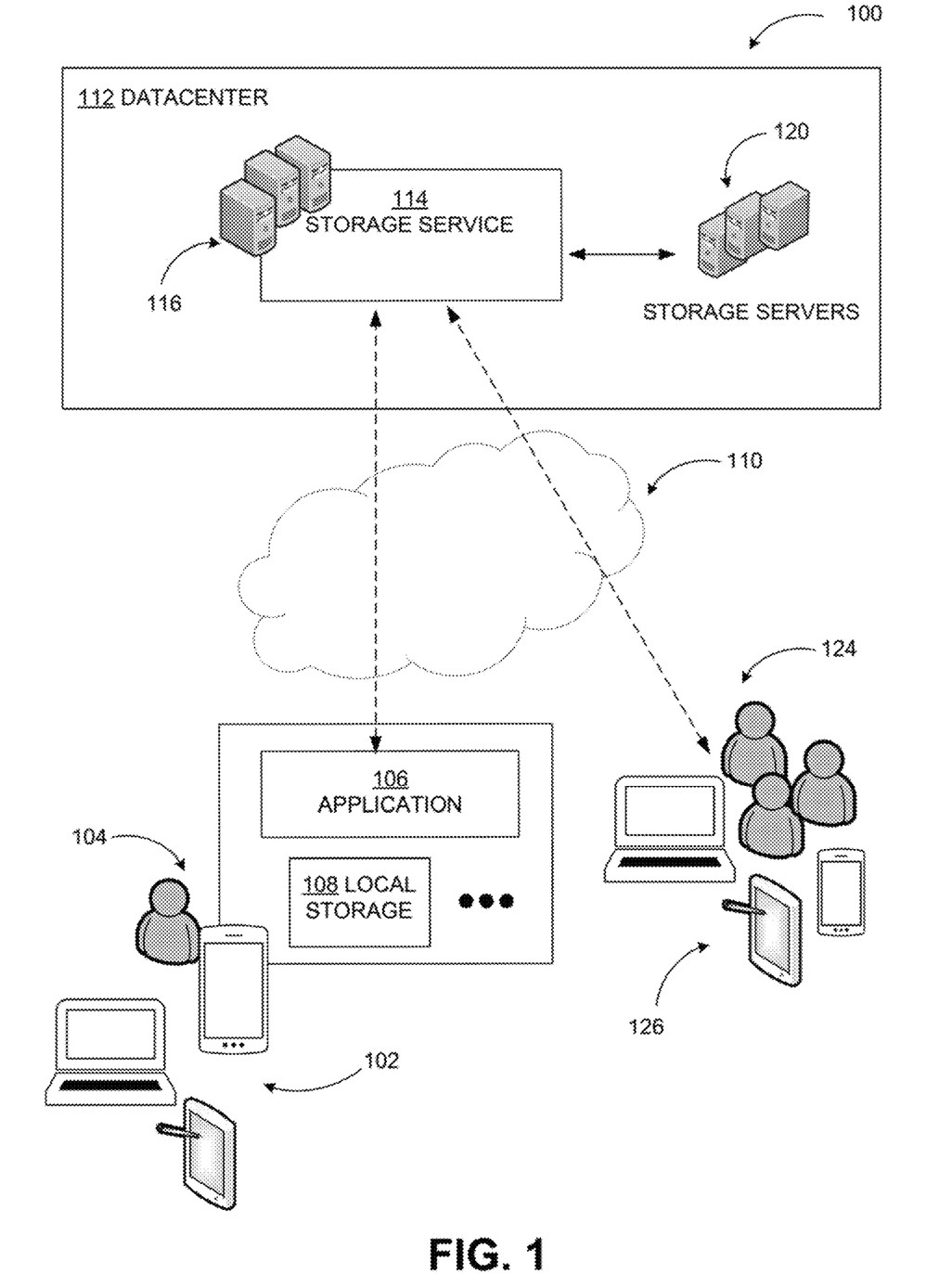
FIG. 1 includes an example network environment where a system to provide policy based hydration behavior in cloud storage synchronization may be implemented.

FIG. 1 includes an example network environment where a system to provide policy based hydration behavior in cloud storage synchronization may be implemented.

As illustrated in diagram 100, an example system may include a datacenter 112 hosting a cloud-based storage service 114 configured to provide storage for and enable sharing of content that may be accessed across multiple devices and users. The datacenter 112 may include one or more processing servers 116 configured to execute the storage service 114, among other components. In some embodiments, at least one of the processing servers 116 may be operable to manage the storage service 114, where data from devices (such as devices 122, 126) may be synchronized with the cloud stored data at storage servers 120 (or associated data stores). As described herein, the storage service 114 may be implemented as software, hardware, or combinations thereof.

In some embodiments, the storage service 114 may be configured to interoperate with various applications to synchronize files stored locally on user associated devices with the same files stored remotely at the storage service 114. For example, as illustrated in the diagram 100, a user 104 may execute a thin (e.g., a web browser) or a thick (e.g., a locally installed client application) version of an application 106 through the device 102 with which the storage service 114 may be configured to integrate and interoperate with over one or more networks, such as network 110. The application 106 may be an application hosted by the storage service, such as a synchronization client, for example. The device 102 may include a desktop computer, a laptop computer, a tablet computer, a vehicle mount computer, a smart phone, or a wearable computing device, among other similar devices. A communication interface may facilitate communication between the storage service 114 and the application 106 over the network 110.

In an example embodiment, the storage service 114 may be configured to receive content stored on local storage 108 of the device 102. The received content may be stored remotely at the storage service 114 within the storage servers 120, for example. Periodic synchronization between the content stored on local storage 108 of the device 102 and the content stored remotely at the storage service 114 may be performed to ensure a most updated version of the content is stored and/or shared at each location.

To prevent undesirable delays or application crashes, user intent and defined policy or policies may be examined by a synchronization engine to determine when a hydration (for example, downloading of a cloud-stored file that is indicated by a placeholder and replacement of the placeholder at the local storage with the downloaded file, i.e., placeholder hydration) should be aborted and instead redirected to viewing the requested file from the cloud (e.g., on the web) or other actions performed, thereby avoiding the download in some examples.

A system according to embodiments allows policy based hydration behavior in cloud storage synchronization. By selectively and dynamically controlling hydration behavior based on policy or policies, increased efficiency, reduced local and cloud computing resource usage, reduced bandwidth usage, and increased security and collaboration may be achieved.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 2:
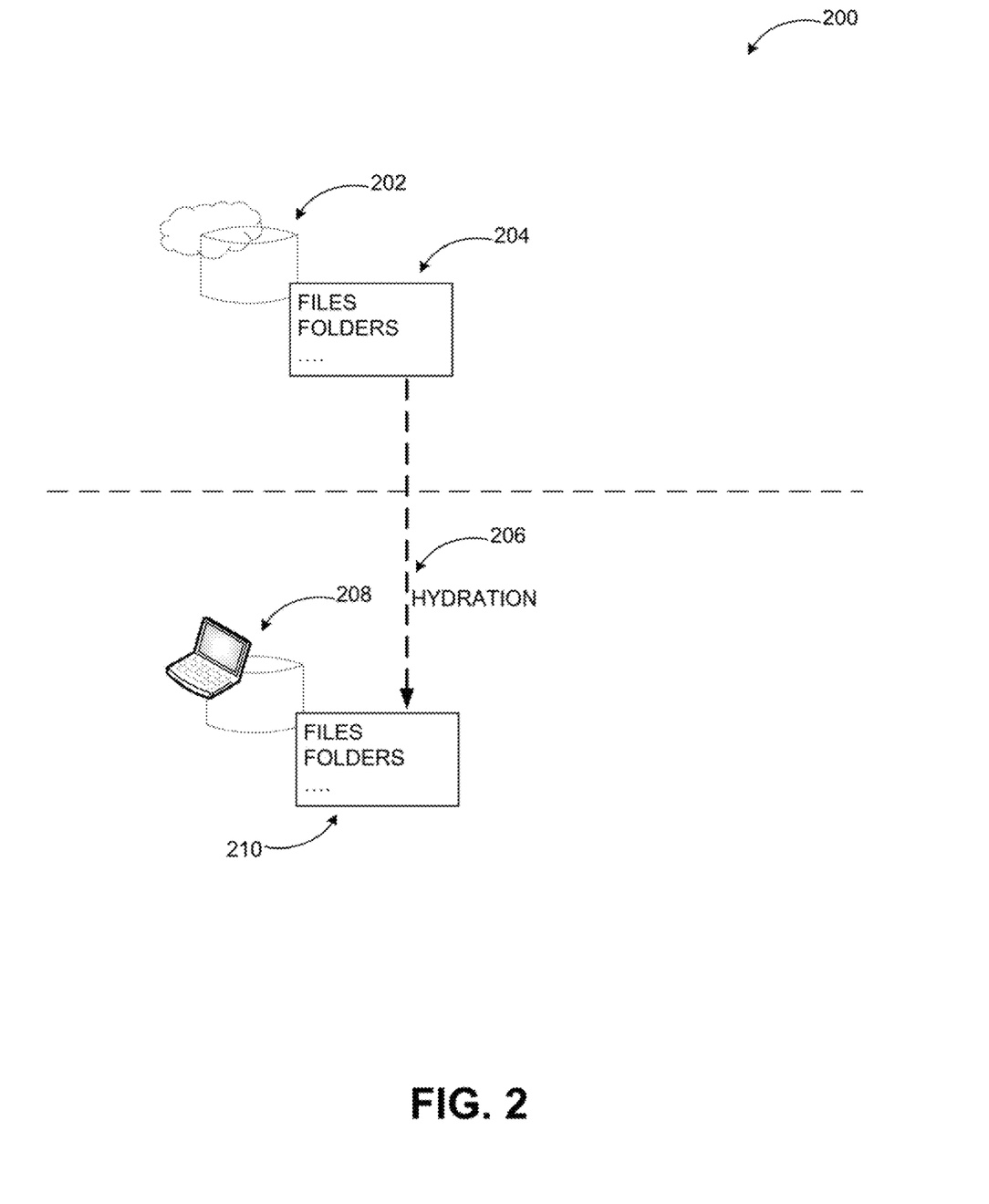
FIG. 2 illustrates conceptually policy based hydration behavior in cloud storage synchronization.

FIG. 2 illustrates conceptually policy based hydration behavior in cloud storage synchronization.

As mentioned above, an application that is attempting to open a cloud stored file may be blocked from continuing until the open operation completes resulting in degraded user experience or crash of the application for larger files and/or slower connections. In such scenarios, a system according to embodiments may redirect the user to a web application to allow viewing of the content from the cloud storage without hydration. In addition, users may have many devices, such as laptops, smart phones, and desktops, some of which may not be appropriate to contain sensitive data such as high impact business data. Thus, users may not be allowed to synchronize all content to all devices. Hydration control based on policy may be implemented to select which devices are allowed to receive the data. A further example where hydration control may performed may include blocking hydration based on the calling application. For example, an antivirus or similar application may be prevented from hydrating files (just for the purpose of scanning the files), but other applications may be allowed to perform hydration. In such cases hydration may be blocked entirely without redirection.

As shown in diagram 200, content 204 in cloud storage 202 such as files, folders, and other forms of data may be synchronized selectively to content 210 at local storage 208. In a system that uses placeholders, the synchronization may involve hydration 206, where selected placeholder files may be replaced with downloaded content.

As discussed herein, the synchronization may be controlled by one or more policies defined by the system as default, by an administrator based on organizational rules, or by the user. A policy that dictates the synchronization behavior may be persisted and updated as needed based on changing circumstances (network connection, organizational rules, new device or application types, etc.). To implement the policy, required operations on the local device may be intercepted. The synchronization engine may determine and execute a suitable action. If the user indeed wishes to hydrate the file (and allowed by the policy), hydration 206 may be performed from the cloud storage.

Figure 3:
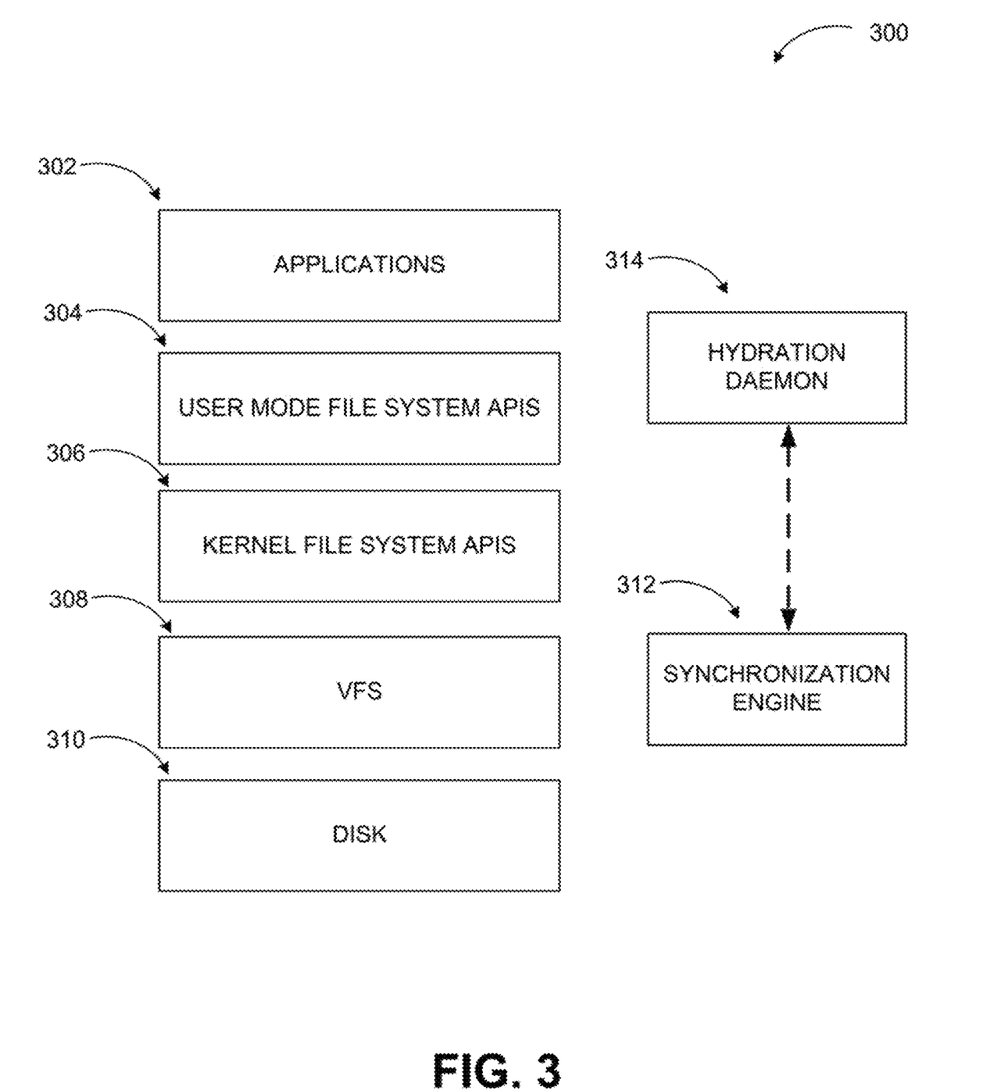
FIG. 3 illustrates example layers of an operating system that may utilize policy based hydration behavior in cloud storage synchronization.

FIG. 3 illustrates example layers of an operating system that may utilize policy based hydration behavior in cloud storage synchronization.

As shown in diagram 300, a typical stack may include applications 302, user mode file system application programming interfaces (APIs) 304, kernel file system APIs 306, virtual file system (VFS) 308, and disk 310. Placeholders (metadata files that include pointers to a cloud storage location of a file) may be implemented in a variety of ways in conjunction with a stack like the one shown in diagram 300. For example, a mini-filter driver system (placeholder code) may be provided between the user mode file system APIs layer 304 and kernel file system APIs layer 306 in an operating system such as Windows® operating systems by MICROSOFT CORP. of Redmond, Wash., and allow third parties to inject code between the file system and the user mode file system APIs. This may provide the means to intercept file open, read, and write requests, hand them off to the synchronization engine, allow the synchronization engine to download the file, and fulfill the original open, read, or write request.

Some operating systems may not allow the placeholder code to be injected between the user mode file system APIs 304 and kernel file system APIs 306. Thus, the code may be inserted either in the applications layer 302 or the VFS layer 308 above the disk 310. Special ".placeholder" files that are associated with a hydration application may be created, for example. The user may activate a ".placeholder" file, the hydration application may open and hydrate the file, and then launch the default application associated with the newly hydrated file. In other implementations, bidirectional links may be used in conjunction with the synchronization engine 312 and hydration daemon 314 to allow synchronization of files represented by placeholders at the local storage. VFS is designed to abstract the details of how files are accessed and stored from the rest of the system. To kernel-space or user-space, the VFS presents an interface that deals in terms of paths and file handles. Internally, VFS may maintain significant state, and read and write blocks on disk in any way it sees fit. VFS implementations may also abstract network file systems, devices, processes, and more. In other examples, comparable implementations may be used in other platforms. For example, KAuth, which is a system built into Macintosh Operating System by Apple Inc. of Cupertino, Calif. or other Unix based operating systems to provide notification to a kernel component on certain file system operations, may be used to hydrate cloud-stored files.

According to some embodiments, a policy based hydration process may be coordinated with the synchronization engine 312 based on determining which files, which devices, and under which conditions are allowed to be hydrated. A policy that dictates the hydration behavior may be persisted and updated as needed. To implement the policy, required operations on the local machine may be intercepted. The synchronization engine may determine and execute a suitable action.

Figure 4:
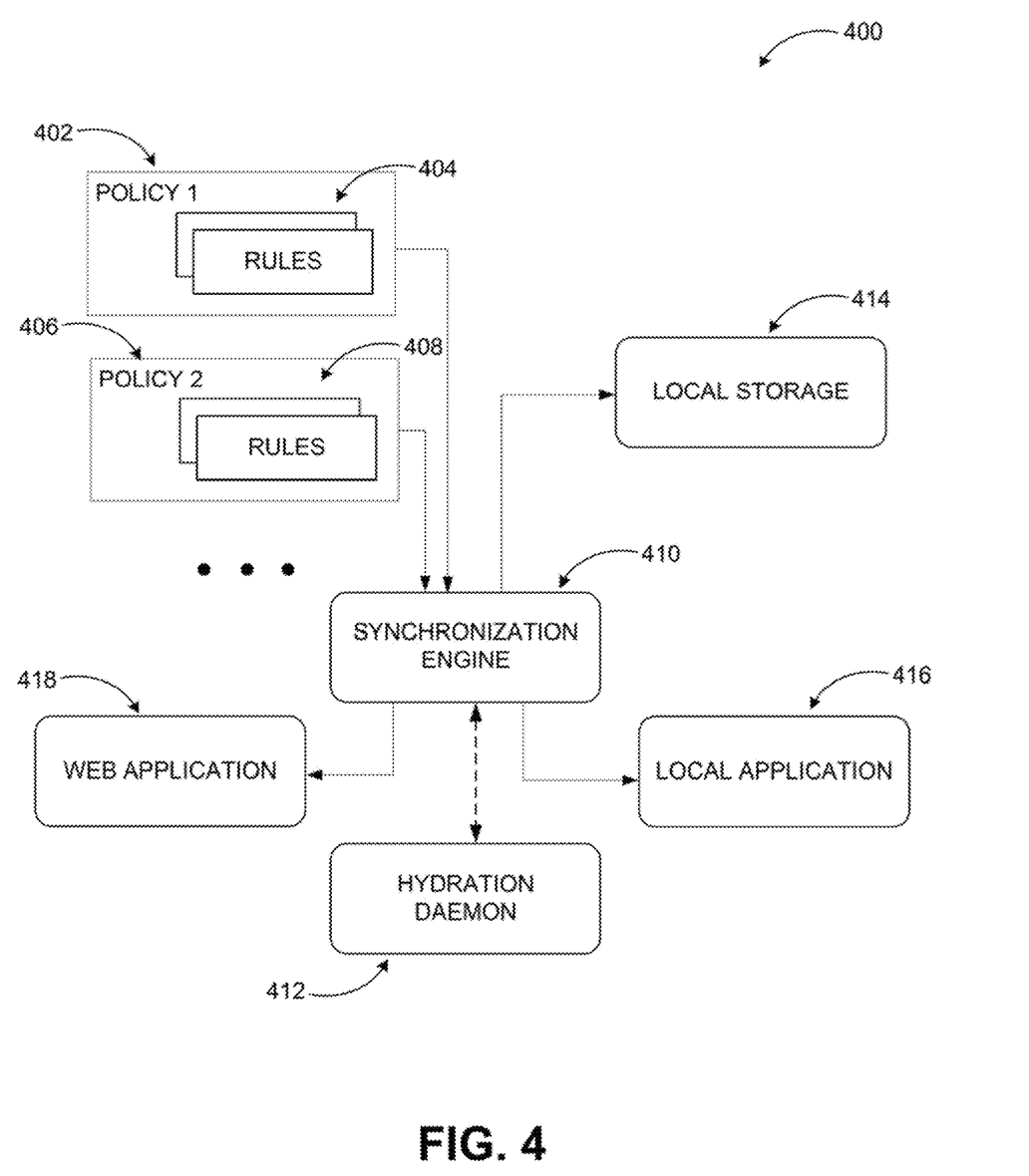
FIG. 4 illustrates example components in providing policy based hydration behavior in cloud storage synchronization.

FIG. 4 illustrates example components in providing policy based hydration behavior in cloud storage synchronization.

Diagram 400 shows some example components that may be employed in determining whether to synchronize cloud stored files to local storage based on an applicable policy. A policy store may include one or more policies 402 and 406. Each policy may include one or more rules 404, 408 defining the criteria for different files to be synchronized under different circumstances. For example, a different policy may be defined for each device associated with a user, for each user account (e.g., work, home, etc.). for each operation on files, etc. Upon receiving a request to synchronize a file to local storage 414, a synchronization engine 410 may determine an applicable policy and rules under that policy. If the applicable policy (and rules) allow the file to be synchronized, the synchronization engine 410 may download the file to the local storage 414 through the hydration daemon 412 and allow the operation to be performed by a local application 416. While not shown in the figure, the policy may be interpreted by both user and kernel mode code. Kernel mode interpretation may be desirable in some circumstances, for example, blocking antivirus applications may be too slow if every operation has to do a kernel-to-user transition.

On the other hand, the policy may not allow the synchronization. There may be different actions that can be taken in this scenario. The synchronization engine 410 may determine the suitable action under the policy and execute. Example actions may include redirection of the synchronization and allowing the user to view the content of the requested file from the cloud storage through a web application 418, blocking the synchronization process entirely if the device or application requesting the synchronization are not permissible under the policy, and others. Redirection of the synchronization may include denying the original file I/O operation that triggered the hydration. For example, if a read operation is what resulted in the initiation of hydrating the file, w that read operation may be denied.

The synchronization behavior policies may include rules based on criteria such as whether there is a handler for the requested file type; whether the requested file is a large file and unlikely to download quickly; whether the file type is typically associated with streaming (such as a video); whether the file is commonly edited, or typically viewed; whether the synchronization engine executed on a device with limited storage capacity or limited hardware capabilities; whether the file includes sensitive data and should not be hydrated locally; whether the application that is requesting the file is explicitly blocked, for usability, performance, application compatibility, or other reasons; and similar criteria.

In some examples, the policy may be multi-tiered. Thus, there may be a base policy provided by the synchronization engine provider, but the organization and/or user may install an additional policy (e.g., user policy) on top of the base policy to customize further. For example, the synchronization engine may provide a policy that includes redirecting to a web application for any file that exceeds 500 mb, but the organization may adjust this limit to 100 mb. The user may choose to override or restrict this further, for example, 50 mb. In cases where an organization policy applies, the policy may also dictate limits for the user's control. For example, users may only have thin clients and the organization may not allow copying of content to local disk limiting the users' ability to adjust the download limit.

The base policy may also have components that may not be allowed to be overridden. For example, blocking certain applications from synchronization may be declared in the base policy, and not allowed to be customized further. This may be necessary in cases where the synchronization engine may not work with certain applications, for example. The policies may be independently updated. From time to time, the synchronization engine provider may choose to update the policy, either in-band or out-of-band with a release. When such an update occurs, the organization policy and/or the user policy may be left intact. In some examples, some of the policy evaluation may be split between kernel and user space code, depending on the design of the synchronization engine. For example, the kernel may know which process is calling, and may make decisions based on that itself, or choose to forward this information to the user space program to decide whether to allow synchronization.

Policies may be embodied as a set of rules that are executed in the order they are found in some embodiments. The input to the policy may be a path that represents the file. Depending on a synchronization engine, the input may also include a process identity, a resource identifier, a tag, file attributes, and similar items. The output may include one of several actions such as "Hydrate" (the file is to be hydrated), "DontHydrate" (the file is not to be hydrated and access to the file is to be denied), "Web" (the file is to be launched on the cloud), or "LaunchOther" (the file is to be launched in an application other than the requesting application). The list of actions may be customized to suit the specific synchronization engines.

According to some examples, a base policy (default) may define a rule to completely block synchronization for certain known application types such as antivirus applications, another rule for redirecting to a web application files of known type (e.g., video files) with sizes that exceed a threshold, and a further rule permitting remaining file types to be synchronized. Users or organizations may be allowed to add more application types to be blocked and/or more file types to be redirected. The threshold for redirection may also be customizable. Users or organizations may also define rules based on sensitive type data and/or devices that are/are not allowed to receive such data.

Taken together, these policies may be stacked to form the synchronization policy for a particular user or device. On some systems, it may be desirable to have a kernel policy that is separate from the base policy. In other words, the base and user policies may be merged ("stacked") to form one policy, but the kernel policy may be separate. A kernel policy may be useful in cases where a quick decision about a file may need to be made in the kernel. For example, anti-virus systems often run a scan that looks at every file on the system, and in such situations involving to user mode to ask for a policy answer may be resource-expensive. In particular, if the action is just to block anti-virus systems from hydrating the file, it may be efficient to make this determination in the kernel. Such a policy may have a more restrictive subset of rules as compared to the base and user policies, as the kernel environment is typically more restrictive.

The base and user policies may be persisted in a location that allows the constituent synchronization engine components to read and execute them. If a kernel policy is to be used, it may be persisted in a location that is accessible to the kernel. Typically, kernel extensions are loaded for the entire system, whereas a synchronization engine may be loaded for a specific user. For this reason, the kernel policy may need to be persisted to a system-wide file location, or stored in another system-wide configuration location.

The base policy may be updated by the synchronization engine periodically in some examples. To facilitate the update, the policy may be stored with a tag that identifies a current version. The user policy may also define a tag that specifies the base policy version it refers to. When the tag of the base policy changes, the synchronization engine may choose to either migrate or discard the user policy to match the updated base policy.

Once a policy has been defined, the synchronization engine may have a mechanism in place to intercept the required system operations in a way that does not cause applications that are not familiar with the process to crash. Thus, the synchronization engine may not always perform the policy based behavior in response to an open( ) or read( ) call as part of placeholder hydration. The synchronization engine may intercept the request earlier, before the application is launched. Following are two example scenarios for launching of the request.

In one example scenario, the file may be launched by double clicking on the file in a directory user interface or in a file finder user interface. In this case, the system looks up the associated application, launches the application, and passes the filename to the application. The "Hydrate" action as discussed above may work within this framework without issues. The "DontHydrate" action may also allow the synchronization engine to intercept the application before being launched and may result in an error message, but the operation may be successfully prevented. The "Web" action, whereby the file is launched on a web application (using the cloud stored file and not download to local storage), may involve two classes of launching applications. First class includes the enlightened applications, that are aware of the synchronization engine's behavior and suppress errors in response to web redirection. Second class includes unenlightened applications, that are not aware of the synchronization engine's behavior, and may show an error when web redirected.

The synchronization engine may deny access to files that are web redirected, and return an error back to the application. Some implementations may also produce a signal that indicates the error, such as a specific error code, an event that may be subscribed to, a property on the file, and so forth. Enlightened applications may look for this signal if they receive an error, and suppress any error messages.

For example, if the policy specifies that .mov files greater than 250 mb should be opened on the web, the following sequence of actions may occur when the application is opened from the directory user interface: (1) the operating system determines the application that is associated with the file; (2) the operating system launches the application and passes the file as an argument; (3) the application calls open( ); (4) the hydration system receives the file system request to open the file, and blocks the request until an evaluation is completed; (5) the hydration system evaluates the policy and determines that the result is "Web"; (6) the hydration system signals to the synchronization engine to open the file through a web application, which launches the user's default browser with the path of the file; (7) the hydration system denies the file open request of the application and sets a signal that indicates the reason (a special return error code, for example); (8) the application receives the deny open request, and inspects the error code; (9) the error code evaluates to the special web error code, and the application exits.

In another example scenario, the file may be launched via an open application user interface or otherwise via the open( ) API. In these cases, the application is already launched, so the actions the synchronization engine may take are to proceed and hydrate the file, or deny access and launch the file on the web. In the case where access is denied, the user may experience an error message unless the application is made aware of the behavior, as described herein.

Figure 5:
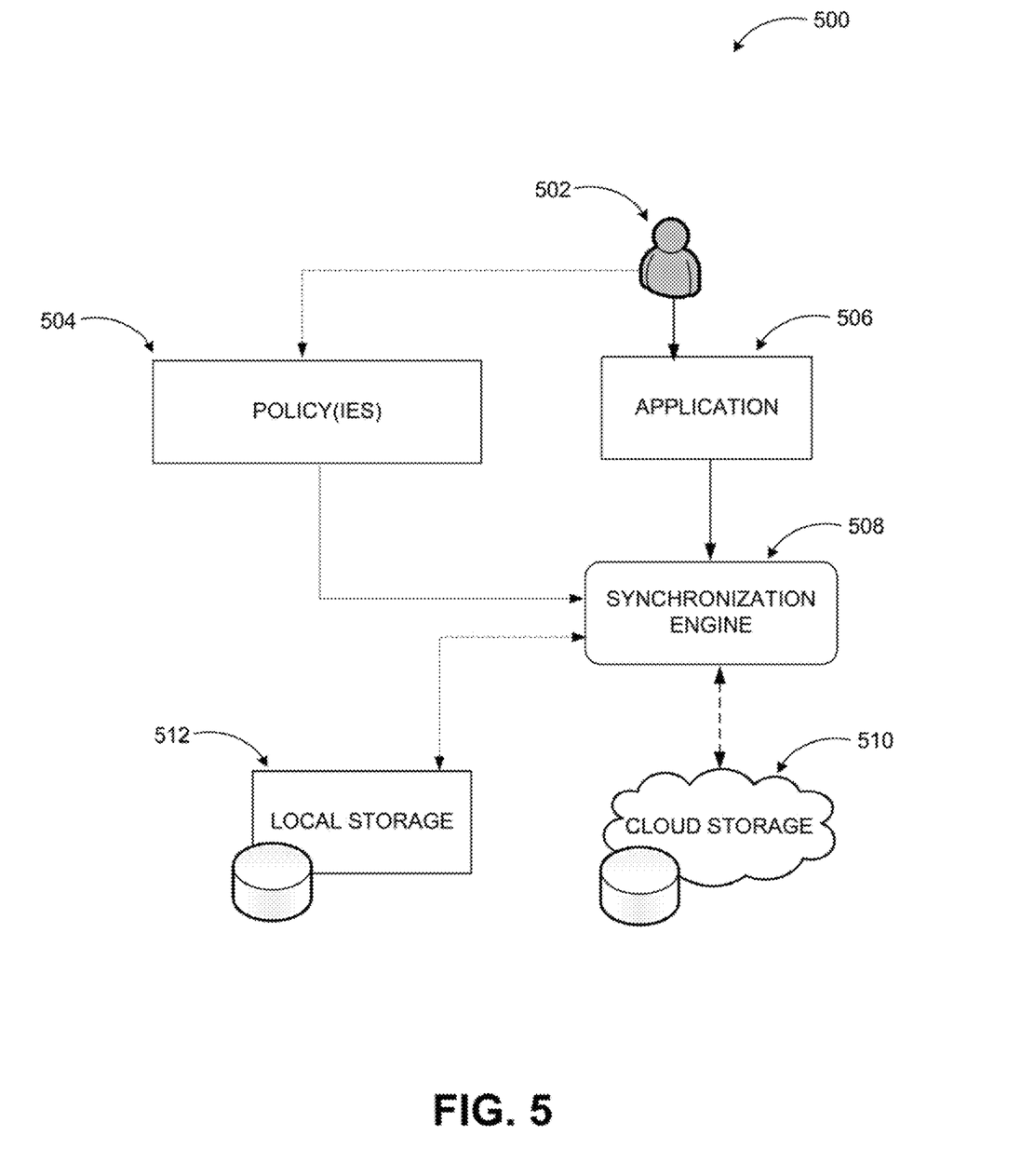
FIG. 5 illustrates example operations used by a synchronization engine in providing policy based hydration behavior in cloud storage synchronization.

FIG. 5 illustrates example operations used by a synchronization engine in providing policy based hydration behavior in cloud storage synchronization.

As shown in diagram 500, policies 504 may control a synchronization behavior by the synchronization engine 508 in downloading files in cloud storage 510 to local storage 512. The request for the synchronization may be received through a user 502 action on a directory user interface or a user interface of an already launched application 506 as discussed herein.

Upon determining one or more policies for a request, the synchronization engine 508 may evaluate the policies. An example evaluation may include (1) loading the base policy and making a copy of the base policy in memory; (2) loading the user policy; (3) traversing the user policy and inspecting each rule by merging the rules if the rule identifier matches a rule in the base policy, and appending the rule to the in-memory policy if the rule identifier is new; and (4) traversing the in-memory policy and evaluating each rule by moving to the next rule if the file in question does not match the rule, and returning the result and stopping evaluating rules if the file in question matches the rule. First three actions may be performed ahead of time to improve performance in some examples.

The policies may be evaluated when a user tries to hydrate a file, either via double click or explicitly (e.g., right click corresponds to making available offline), when a new file is added to the synchronization engine either locally or remotely, or when the policy is updated by the synchronization engine provider or the organization.

In some systems, a kernel-level component may trigger a hydration request in the user-level synchronization engine. The file's path and possibly other metadata may be provided to the synchronization engine. At that time, the policy may be evaluated and the result returned.

The policy may also be evaluated when adding new files. In one example scenario, a new file may appear on the server, and may be made available to the synchronization engine. The policy may be evaluated to determine whether or not the new file is to be hydrated. If the answer is "Hydrate", the file may be hydrated. If the answer is "DontHydrate", "LaunchOther", or "Web", the file may be rendered as a placeholder in local storage 512. In another example scenario, the user may add a new file locally. The synchronization engine may first upload it to the cloud, upon completion of the upload, the synchronization engine may evaluate the policy. If the result of the evaluation is "Hydrate", it may be left on disk. If the result of the evaluation is "DontHydrate", it may be dehydrated and replaced with a placeholder. This arrangement may facilitate the implementation of "drop folders" whereby files are dropped and immediately rendered as placeholders.

The policy may also be evaluated when it is updated, either by the synchronization engine provider or the organization. This may facilitate scenarios where the organization decides to retroactively dehydrate a certain class of files (sensitive data). When evaluating a policy update, the synchronization engine may scan an entire tree of files with following results: (1) Anything marked "Hydrate" is left on disk; (2) Anything marked "DontHydrate" is removed from disk and replaced with a placeholder, regardless of whether the user has explicitly hydrated the file or not; (3) Anything marked "Web" or "LaunchOther" is removed from disk, unless the user has explicitly hydrated the file, in which case it is left on disk. These example scenarios are for illustration purposed and do not constitute limitation on embodiments.

In some example scenarios, the user may open a file on the cloud and actually want to hydrate the file locally. For example, the user may click an "Edit in Application" button. The system may determine that this is a web redirected file and signal to the cloud to send a notification to the synchronization engine to hydrate the file. The synchronization engine may receive the notification and hydrate the file, and then launch the default handler for the application. For sensitive data files, this behavior may be blocked. Sensitive files may be annotated by a "DontHydrate" result leaving these files as blocked from hydration and only presented as shortcuts to the cloud.

The examples provided in FIGS. 1 through 5 are illustrated with specific systems, services, applications, modules, codes, and notifications. Embodiments are not limited to environments according to these examples. Policy based hydration behavior in cloud storage synchronization may be implemented in environments employing fewer or additional systems, services, applications, engines, codes, and user experience configurations. Furthermore, the example systems, services, applications, modules, and notifications shown in FIG. 1 through 5 may be implemented in a similar manner with other values using the principles described herein.

Figure 6:
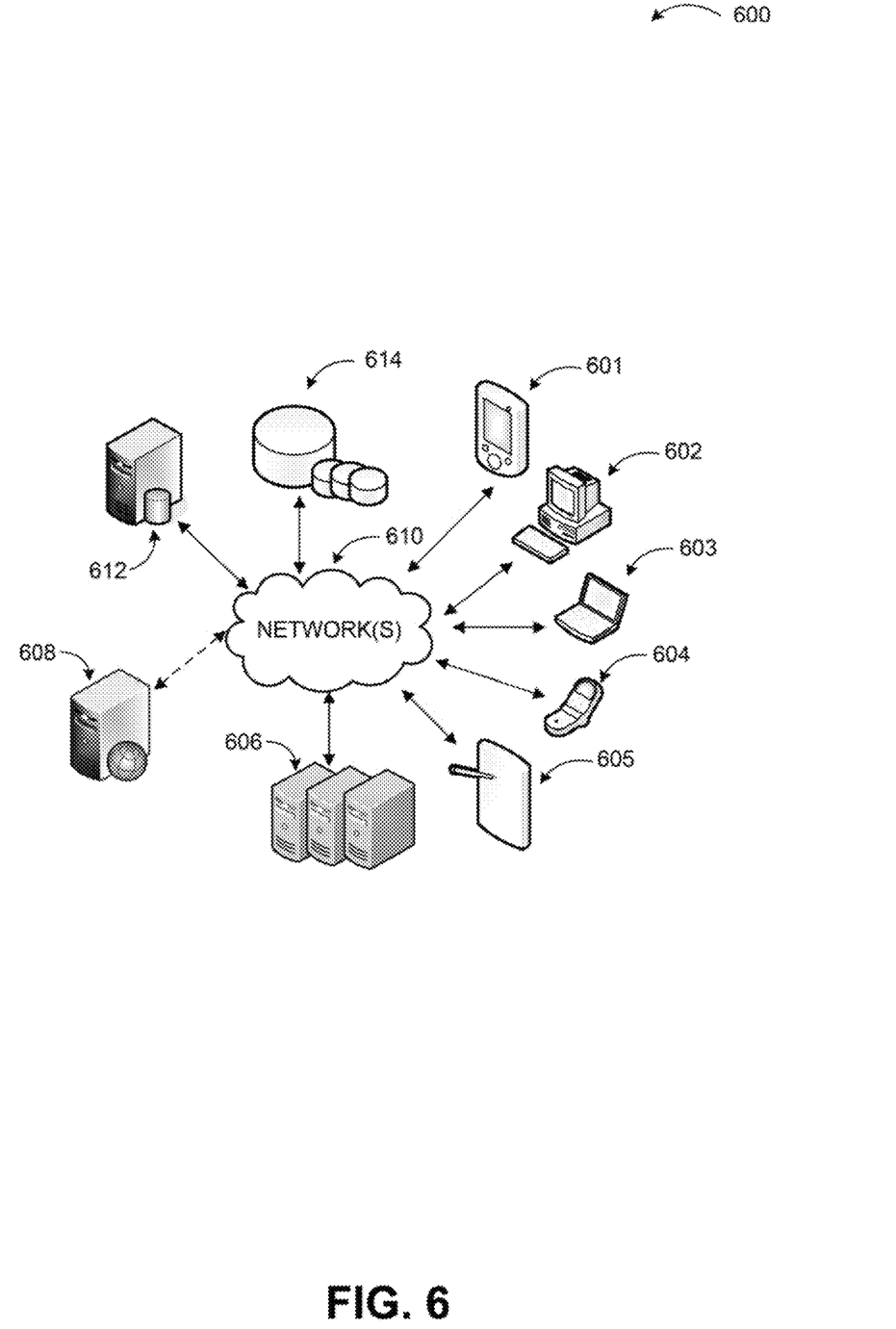
FIG. 6 is a networked environment, where a system according to embodiments may be implemented.

FIG. 6 is a networked environment, where a system according to embodiments may be implemented. In addition to locally installed applications (for example, application 106 or synchronization client 206), policy based hydration behavior in cloud storage synchronization may also be employed in conjunction with hosted applications and services (for example, a storage service 114) that may be implemented via software executed over one or more servers 606, individual server 608, or at client devices, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data such as cloud stored versions of the files may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for policy based hydration behavior in cloud storage synchronization. Furthermore, the networked environments discussed in FIG. 6 are for illustration purposes only. Embodiments are not limited to the example applications, engines, or processes.

Figure 7:
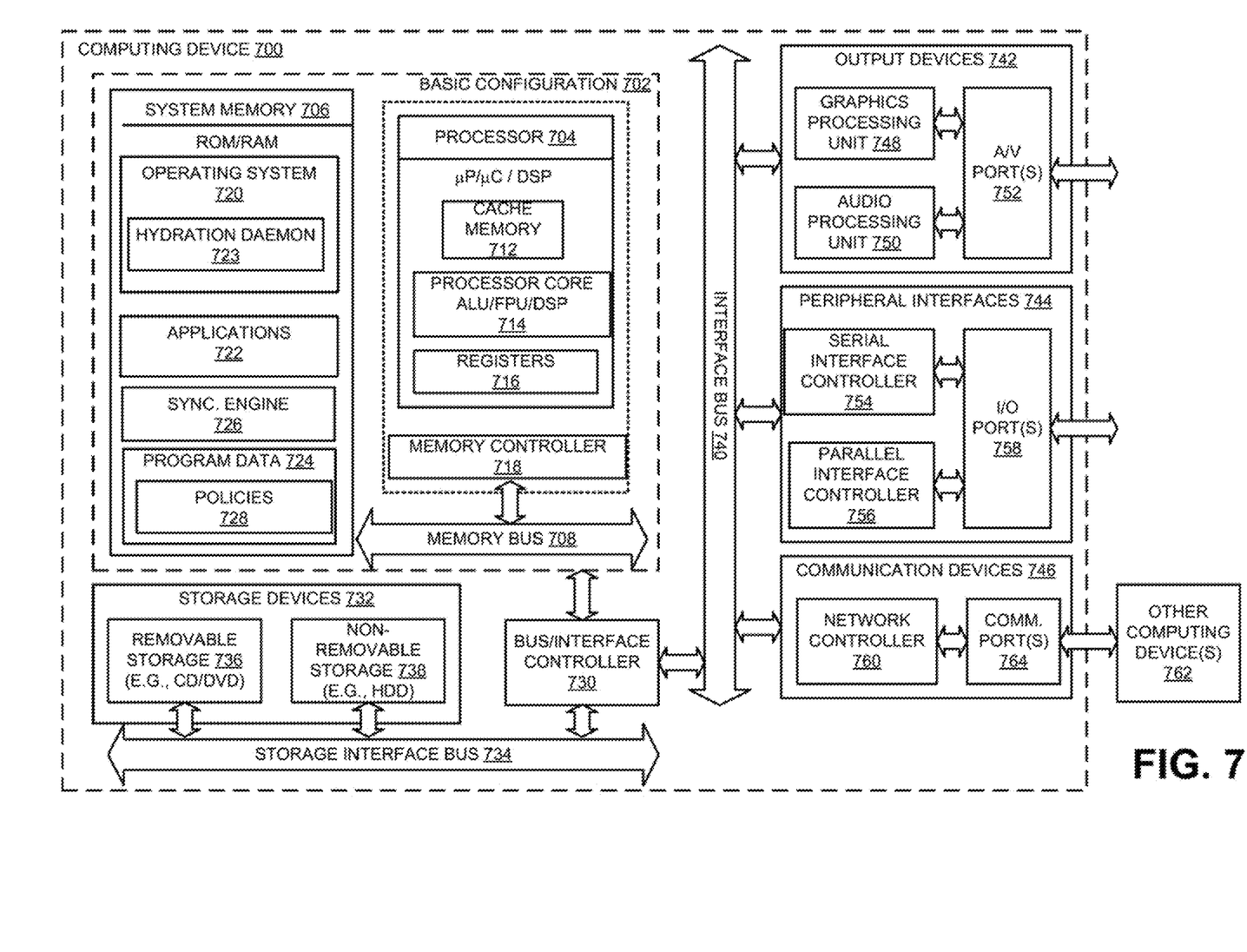
FIG. 7 is a block diagram of an example general purpose computing device, which may be used to provide policy based hydration behavior in cloud storage synchronization.

FIG. 7 is a block diagram of an example general purpose computing device, which may be used to provide policy based hydration behavior in cloud storage synchronization.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, one or more applications 722, a synchronization engine 726, and program data 724. The synchronization engine 726 may synchronize files between a local storage and a cloud storage. The operating system 720 may include a hydration daemon 723 to provide hydration of placeholders in synchronization of files. The program data 724 may include, among other data, policies 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide policy based hydration behavior in cloud storage synchronization. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
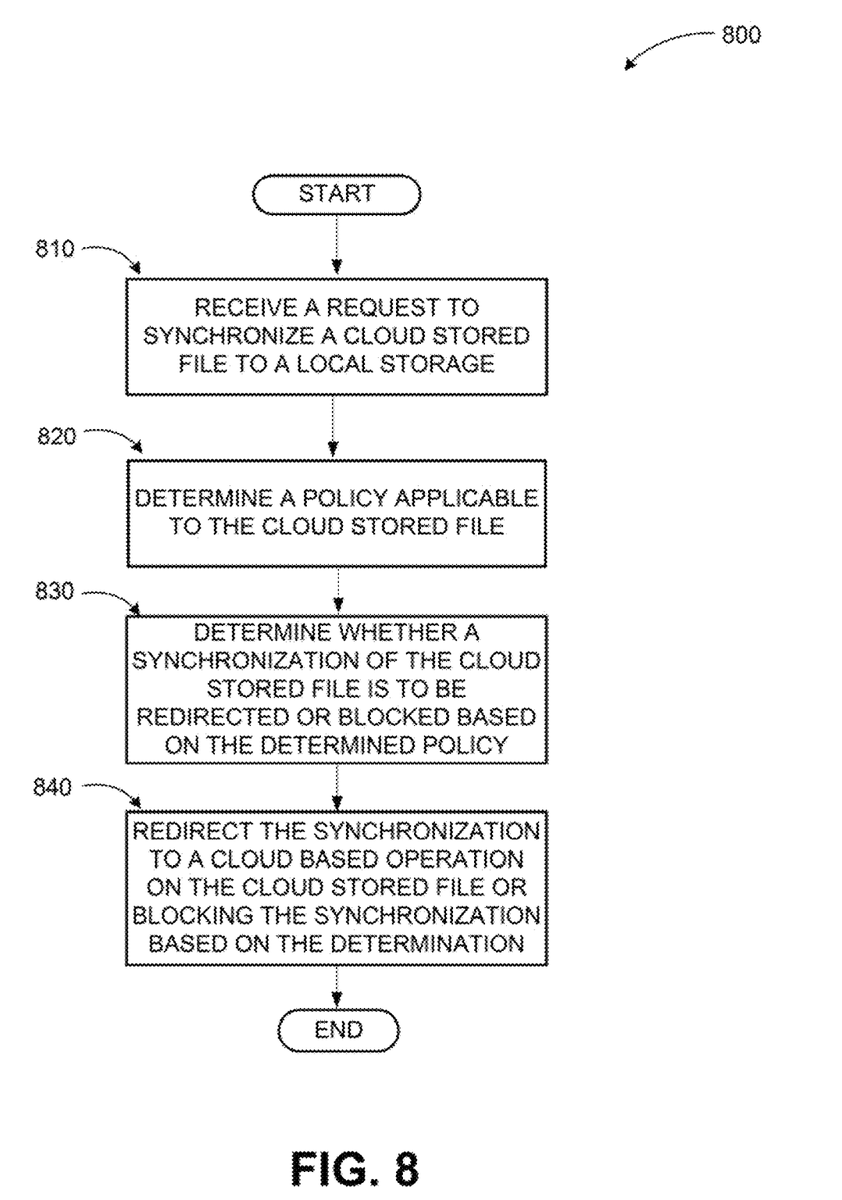
FIG. 8 illustrates a logic flow diagram of a method to provide policy based hydration behavior in cloud storage synchronization.

FIG. 8 illustrates a logic flow diagram of a method to provide policy based hydration behavior in cloud storage synchronization, according to embodiments.

Process 800 may be implemented on a computing device, server, or other system. An example system may include a computer communicatively coupled to a cloud storage server with files synchronized between the computer's local storage and the cloud storage.

Process 800 begins with operation 810, where a request to synchronize a cloud stored file to a local storage may be received from an application or a directory user interface (e.g., clicking on a file). At operation 820, a policy applicable to the cloud stored file may be determined. The policies may be system default, administrator defined, and/or user defined. The policies may specify which files may be synchronized (hydrated) with cloud stored content, which devices may have which files synchronized, which application types may have files synchronized, and other comparable criteria.

At operation 830, a determination may be made whether a synchronization of the cloud stored file is to be redirected or blocked based on the determined policy in operation 820. As discussed previously, some files may be provided to be viewed (or other operations) through a web application without actually downloading the file to the local storage. In other cases, the synchronization may be blocked entirely if the device or requesting application type is not appropriate under the applicable policy. At operation 840, the synchronization may be redirected to a cloud based operation on the cloud stored file or blocked entirely based on the determination.

The operations included in process 800 are for illustration purposes. Policy based hydration behavior in cloud storage synchronization may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing policy based hydration behavior in cloud storage synchronization is described. The means may include a means for receiving a request to synchronize a cloud stored file to a local storage; a means for determining a policy applicable to the cloud stored file; a means for determining whether a synchronization of the cloud stored file is to be redirected or blocked based on the determined policy; and a means for redirecting the synchronization to a cloud based operation on the cloud stored file or blocking the synchronization based on the determination.

According to some examples, a method to provide policy based hydration behavior in cloud storage synchronization is described. The method may include receiving a request to synchronize a cloud stored file to a local storage; determining a policy applicable to the cloud stored file; determining whether a synchronization of the cloud stored file is to be redirected or blocked based on the determined policy; and redirecting the synchronization to a cloud based operation on the cloud stored file or blocking the synchronization based on the determination.

According to other examples, determining the policy applicable to the cloud stored file may include retrieving a combined policy from a policy store, where the combined policy includes a base policy and one or both of an organization policy and a user policy. The base policy may include at least one customizable rule and at least one non-customizable rule. The organization policy may include at least one rule defining a limit for the user limit. The method may also include evaluating the determined policy at a synchronization engine. Evaluating the determined policy may include determining whether the synchronization of the cloud stored file is to be redirected or blocked based on one or more of a file size, a network connection, a requesting application type, a device attribute, a file type, and a user attribute.

According to further examples, the method may further include redirecting the synchronization to the cloud based operation in response to determining one or more of: the file size being above a predefined limit, the network connection being slower than a predefined limit, the requesting application being of a predefined type, the device having a predefined attribute, a rule set by an organization policy, and the file being of a predefined type. The cloud based operation may include performing an open operation on the cloud stored file through a web application. The method may also include blocking the synchronization in response to determining one or more of: the requesting application being of a predefined type, the device having a predefined attribute, the user having a predefined attribute, and the file being of a predefined type.

According to other examples, a computing device to provide policy based hydration behavior in cloud storage synchronization is described. The computing device may include a communication interface configured to facilitate communication between the computing device and a cloud storage service; a memory configured to store instructions; and one or more processors coupled to the memory. The processors, in conjunction with the instructions stored in the memory, may be configured to receive a request to synchronize a cloud stored file to a local storage; retrieve a combined policy applicable to the cloud stored file from a policy store, where the combined policy includes a base policy and one or both of an organization policy and a user policy; evaluate the combined policy; determine whether a synchronization of the cloud stored file is to be performed, redirected, or blocked based on the evaluated policy; and synchronize the cloud stored file to the local storage, redirect the synchronization to a cloud based operation on the cloud stored file, or block the synchronization based on the determination.

According to some examples, the one or more processors may be configured to evaluate the combined policy by loading the base policy and making a copy of the base policy in the memory; loading the user policy; traversing the user policy and inspecting each rule within the user policy by merging rules if a rule identifier matches a rule in the base policy; and appending the rule to the base policy in the memory if the rule identifier is new. The one or more processors may be further configured to evaluate the combined policy by traversing the base policy in the memory and evaluating each rule by moving to a next rule if the cloud stored file does not match the rule, and returning a result and stopping evaluating the rules if the cloud stored file matches the rule.

According to other examples, the one or more processors may be further configured to store and evaluate a kernel policy distinct from the base policy. The kernel policy may be stored at a system-wide file location and the combined policy is stored at a user-specific file location. The one or more processors may be further configured to in response to receiving an update to the base policy, evaluate the base policy, and one of persist and remove the organization policy and the user policy.

According to further examples, a physical computer-readable memory device with instructions stored thereon to provide policy based hydration behavior in cloud storage synchronization may be described. The instructions may include receiving a request to synchronize a cloud stored file to a local storage; retrieving a stacked policy applicable to the cloud stored file from a policy store, where the stacked policy includes a base policy and one or both of an organization policy and a user policy; evaluating the stacked policy by traversing the user policy and inspecting each rule within the user policy by merging rules if a rule identifier matches a rule in the base policy, appending the rule to the base policy if the rule identifier is new, traversing the base policy and evaluating each rule by moving to a next rule if the cloud stored file does not match the rule, and returning a result and stopping evaluating the rules if the cloud stored file matches the rule; determining whether a synchronization of the cloud stored file is to be performed, redirected, or blocked based on the evaluated policy; and synchronizing the cloud stored file to the local storage, redirect the synchronization to a cloud based operation on the cloud stored file, or block the synchronization based on the determination.

According to some examples, the instructions may further include determining whether to launch a first application distinct from second application requesting the synchronization to perform an operation on the cloud stored file; synchronizing the cloud stored file to the local storage; and allowing the first application to perform the operation on the synchronized file. Determining whether the synchronization of the cloud stored file is to be performed, redirected, or blocked based on the evaluated policy may include determining a user intent based on whether the file has been edited or viewed previously. The stacked policy may be specific to one of a device, a user, a file type, an application type, and an organization. The request may be received from one of a user interface of a launched application and a user interface of a directory.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide policy based hydration behavior in cloud storage synchronization, the method comprising:
   receiving a request to synchronize a cloud stored file to a local storage;
   determining, with a processor, a policy applicable to the cloud stored file;
   determining, with the processor, whether a synchronization of the cloud stored file is to be redirected or blocked based on the determined policy; and
   based on the determined policy
     avoiding a download of the cloud stored file to the local storage, wherein avoiding the download includes redirecting, with the processor, the synchronization of the cloud stored file to a cloud based operation on the cloud stored file or blocking, with the processor, the synchronization of the cloud stored file.

2. The method of claim 1, wherein determining the policy applicable to the cloud stored file comprises:
   retrieving a combined policy from a policy store, wherein the combined policy includes a base policy and one or both of an organization policy and a user policy.

3. The method of claim 2, wherein the base policy includes at least one customizable rule and at least one non-customizable rule.

4. The method of claim 2, wherein the organization policy includes at least one rule defining a limit for the user limit.

5. The method of claim 1, further comprising:
   evaluating the determined policy at a synchronization engine.

6. The method of claim 5, wherein evaluating the determined policy comprises:
   determining whether the synchronization of the cloud stored file is to be redirected or blocked based on one or more of a file size, a network connection, a requesting application type, a device attribute, a file type, and a user attribute.

7. The method of claim 6, further comprising:
   redirecting the synchronization to the cloud based operation in response to determining one or more of: the file size being above a predefined limit, the network connection being slower than a predefined limit, the requesting application being of a predefined type, the device having a predefined attribute, a rule set by an organization policy, and the file being of a predefined type.

8. The method of claim 7, wherein the cloud based operation is performing an open operation on the cloud stored file through a web application.

9. The method of claim 6, further comprising:
   blocking the synchronization in response to determining one or more of: the requesting application being of a predefined type, the device having a predefined attribute, the user having a predefined attribute, and the file being of a predefined type.

10. A computing device to provide policy based hydration behavior in cloud storage synchronization, the computing device comprising:
    a communication interface configured to facilitate communication between the computing device and a cloud storage service;
    a memory configured to store instructions; and
    one or more processors coupled to the memory, wherein the one or more processors, in conjunction with the instructions stored in the memory, are configured to:
      receive a request to synchronize a cloud stored file to a local storage;
      retrieve a combined policy applicable to the cloud stored file from a policy store, wherein the combined policy includes a base policy and one or both of an organization policy and a user policy;
      evaluate the combined policy;
      determine whether a synchronization of the cloud stored file is to be performed, redirected, or blocked based on the evaluated policy; and
      synchronize the cloud stored file to the local storage, redirect the synchronization to a cloud based operation on the cloud stored file, or block the synchronization based on the determination.

11. The computing device of claim 10, wherein the one or more processors are configured to evaluate the combined policy by:
    loading the base policy and making a copy of the base policy in the memory;
    loading the user policy;
    traversing the user policy and inspecting each rule within the user policy by merging rules if a rule identifier matches a rule in the base policy; and appending the rule to the base policy in the memory if the rule identifier is new.

12. The computing device of claim 11, wherein the one or more processors are further configured to evaluate the combined policy by:
   traversing the base policy in the memory and evaluating each rule by moving to a next rule if the cloud stored file does not match the rule, and
   returning a result and stopping evaluating the rules if the cloud stored file matches the rule.

13. The computing device of claim 10, wherein the one or more processors are further configured to:
   store and evaluate a kernel policy distinct from the base policy.

14. The computing device of claim 13, wherein the kernel policy is stored at a system-wide file location and the combined policy is stored at a user-specific file location.

15. The computing device of claim 10, wherein the one or more processors are further configured to:
   in response to receiving an update to the base policy, evaluate the base policy, and
   one of persist and remove the organization policy and the user policy.

16. A physical computer-readable memory device with instructions stored thereon to provide policy based hydration behavior in cloud storage synchronization, the instructions comprising:
   receiving a request to synchronize a cloud stored file to a local storage;
   retrieving a stacked policy applicable to the cloud stored file from a policy store, wherein the stacked policy includes a base policy and one or both of an organization policy and a user policy;
   evaluating the stacked policy by:
      traversing the user policy and inspecting each rule within the user policy by merging rules if a rule identifier matches a rule in the base policy,
      appending the rule to the base policy if the rule identifier is new,
      traversing the base policy and evaluating each rule by moving to a next rule if the cloud stored file does not match the rule, and
      returning a result and stopping evaluating the rules if the cloud stored file matches the rule;
   determining whether a synchronization of the cloud stored file is to be performed, redirected, or blocked based on the evaluated policy; and
   synchronizing the cloud stored file to the local storage, redirect the synchronization to a cloud based operation on the cloud stored file, or block the synchronization based on the determination.

17. The computer-readable memory device of claim 16, wherein the instructions further comprise:
   determining whether to launch a first application distinct from second application requesting the synchronization to perform an operation on the cloud stored file;
   synchronizing the cloud stored file to the local storage; and
allowing the first application to perform the operation on the synchronized file.

18. The computer-readable memory device of claim 16, wherein determining whether the synchronization of the cloud stored file is to be performed, redirected, or blocked based on the evaluated policy comprises determining a user intent based on whether the file has been edited or viewed previously.

19. The computer-readable memory device of claim 16, wherein the stacked policy is specific to one of a device, a user, a file type, an application type, and an organization.

20. The computer-readable memory device of claim 16, wherein the request is received from one of a user interface of a launched application and a user interface of a directory.

* * * * *